June 17, 1958 — R. A. MacMILLAN — 2,839,616
PHOTOELECTRIC CONVERTER SYSTEM
Filed Jan. 15, 1954
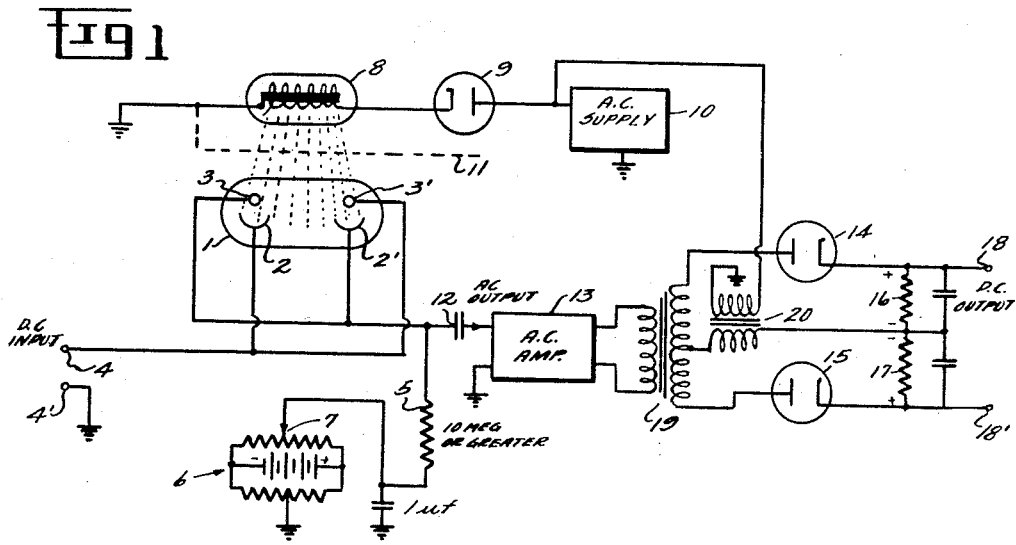
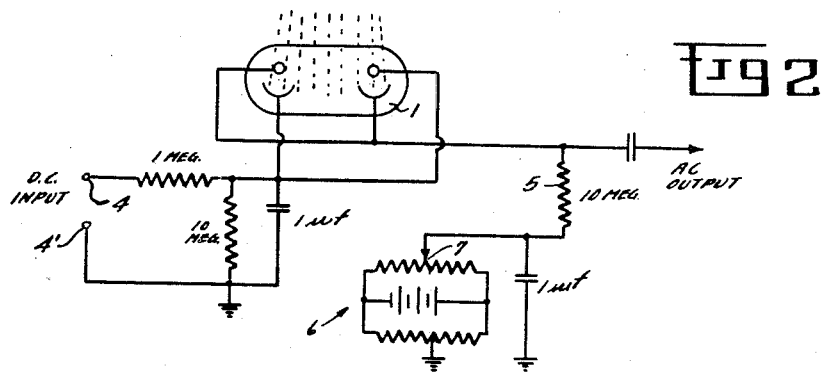
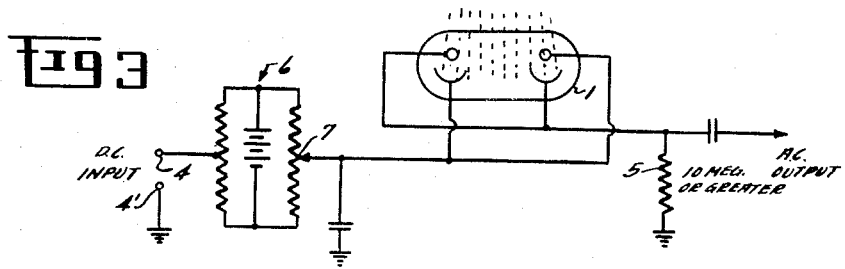
INVENTOR.
RAYMOND A. MACMILLAN

United States Patent Office

2,839,616
Patented June 17, 1958

2,839,616

PHOTOELECTRIC CONVERTER SYSTEM

Raymond A. MacMillan, Greenwood, Mass., assignor to the United States of America as represented by the Secretary of the Air Force Application January 15, 1954, Serial No. 404,403

6 Claims. (Cl. 179—171)

(Granted under Title 35, U. S. Code (1952), sec. 266)

The invention described herein may be manufactured and used by or for the Government for governmental purposes without the payment to me of any royalty thereon.

This invention relates to apparatus for converting direct potentials to alternating potentials. The invention is particularly useful in connection with D. C. amplifiers of the type in which the direct voltage to be amplified is converted into an alternating voltage for amplification in an A. C. amplifier and then reconverted to a direct voltage. Such amplifiers should have an output voltage proportional to the input voltage and of the same or opposite polarity. Also, it is often desirable that the amplifier operate with extremely small input potentials and that it have a high input impedance so as to produce no appreciable load on the input potential source. It is accordingly the object of this invention to provide a converter for small D. C. potentials which has a high input impedance and an A. C. output proportional in amplitude to the D. C. input and indicative of its polarity. It is a further object of the invention to provide a D. C. amplifier incorporating such a converter.

The converter consists essentially of a circuit comprising, in series, the input D. C. potential, a direct voltage adjustable in amplitude and polarity, and a pair of parallel connected oppositely poled photoelectric cells of the photo-cathode type having their cathodes equally illuminated by a modulated light source. With the D. C. input potential at a reference value, which may be zero, the adjustable voltage is set for zero output. Departure of the input potential from the reference value then generates an A. C. output proportional to the amount of departure and indicative of its phase of the direction of departure.

A more detailed description of the invention will be given in connection with the specific embodiments thereof shown in the accompanying drawings, in which—

Fig. 1 is a schematic diagram of a D. C. amplifier employing one embodiment of the converter, and Figs. 2 and 3 are diagrams of other embodiments of the converter usable in Fig. 1.

Referring to Fig. 1, the similar sections of dual cell photoelectric tube 1 have photocathodes 2 and 2' and anodes 3 and 3'. The cells are connected in parallel and oppositely poled by connecting photocathode 2 to anode 3' and photocathode 2' to anode 3. The parallel connected cells are connected in series with D. C. signal input terminals 4 and 4', load resistor 5 and balancing voltage source 6. The voltage from source 6 may be adjusted to a desired amplitude of either polarity by contact 7. The photocathodes 2 and 2' are equally illuminated by a light source 8, such as a neon lamp. The light source is energized through rectifier 9 from A. C. source 10 so that one flash of light is produced for each cycle of the A. C. supplied by source 10. The light 8 and associated circuit may be electrically isolated from the converter by an electrostatic shield 11.

Assuming that the photocells in tube 1 are identical and that their photocathodes are equally illuminated, and assuming that the D. C. input potential and the voltage at contact 7 are zero, there will nevertheless be a current flow between the anodes and the cathodes of the two cells when the cathodes are illuminated due to the energy in the emitted electrons. This energy is derived from the light in the process of photoemission. Under the above idealized conditions the currents in the two cells are equal and no current flows in the external circuit. As a result, no output potential is developed across resistor 5. If a potential of positive polarity is now applied to terminal 4 of the terminals 4 and 4', the conduction in cell 2'—3' increased and that in cell 2—3 is reduced so that the two currents are no longer equal and their difference flowing through resistor 5 produces an output voltage pulse for each flash of lamp 8. The D. C. component of the unidirectional pulse wave across resistor 5 is blocked by condenser 12 so that an A. C. wave is applied to the input of amplifier 13. Had the input potential been of negative polarity the conduction in cell 2—3 would have exceeded that in cell 2'—3' and the resulting A. C. wave applied to amplifier 13 would have been reversed in phase. The converter therefore applies to the input of amplifier 13 an A. C. voltage proportional in amplitude to the D. C. input potential and having one of two inversely related phases depending upon the polarity of the input potential, or else upon its magnitude relative to a reference voltage, as will be explained later.

The output of amplifier 13 is applied with equal amplitude and opposite phase to the anodes of rectifiers 14 and 15 which have load resistors 16 and 17, respectively. Also, a constant amplitude reference voltage derived from source 10 is applied in equal amplitude and phase to the anodes of rectifiers 14 and 15. These rectifiers and associated circuit constitute a phase sensitive detector. When the output of A. C. amplifier 13 is zero the voltages developed across resistors 16 and 17 are equal and the resultant output from terminals 18 and 18' is zero. In the presence of an output signal from amplifier 13 the output of that rectifier to which the two A. C. voltages are applied in the same phase will be greater than the output of the other rectifier to which the voltages are applied in opposite phase. Consequently, a voltage difference exists between terminals 18 and 18' and the polarity of this voltage on terminal 18 referred to terminal 18' is determined by the relative magnitudes of the two rectifier voltages. Should the polarity of the D. C. input potential between terminals 4 and 4' reverse, the phase of the amplifier 13 output would be reversed and as a result the polarity of the D. C. output from terminal 18 to 18' would reverse. By proper phasing of transformer 19 or 20, the output potential may be made to have the same or opposite polarity with respect to that of the input potential between terminals 4 and 4'.

It is also possible to have the output potential from terminal 18 to 18' equal zero when the input potential between terminals 4 and 4' equals a predetermined reference voltage of either polarity. In this case, the magnitude of the output potential is proportional to the degree of departure of the input signal from the reference voltage and the polarity indicates the direction of departure. To adjust the circuit for this mode of operation the reference voltage is applied to input terminals 4 and contact 7 is adjusted for zero voltage across resistor 5. In practical applications, the adjustment provided by contact 7 is also used when the reference voltage is zero since it is usually necessary to compensate for slight differences in the two photocells and the illumination of their cathodes. The adjustment procedure for the circuit is therefore the same for all reference potentials including zero.

Figs. 2 and 3 show sight circuit modifications of the converter as compared with that of Fig. 1. Their operation is the same as that of the converter in Fig. 1 and they may be substituted therefor.

What is claimed is:

1. A converter comprising a pair of photocells each having a photocathode and an anode, a pair of direct current input terminals, a load resistance, means connecting one of said cells and said load resistance in series across said terminals, a connection consisting entirely of a conductor of negligible impedance between the photocathode of the other cell and the anode of said one cell, a connection consisting entirely of a conductor of negligible impedance between the anode of the other cell and the photocathode of said one cell, means for applying a periodically varying illumination equally to said cathodes and an output circuit connected across said load resistance.

2. A converter comprising first and second photocells each having a photocathode and an anode, a pair of direct current input terminals, a load resistance, means for producing a direct voltage of desired amplitude and polarity, means connecting one of said cells, said load impedance and said means for producing a direct voltage in series across said terminals, a connection consisting entirely of a conductor of negligible impedance between the photocathode of the other cell and the anode of said one cell, a connection consisting entirely of a conductor of negligible impedance between the anode of the other cell and the photocathode of said one cell, means for applying a periodically varying illumination equally to said cathodes and an output circuit connected across said load resistance.

3. Apparatus as claimed in claim 2 in which said illuminating means is a gaseous discharge device energized from a source of alternating current.

4. Apparatus as claimed in claim 2 in which a light pervious electrostatic shield is situated between said illuminating means and said photocells.

5. A converter comprising first and second photocells each having a photocathode and an anode; a pair of direct current input terminals; a load resistance; means for producing a direct voltage of desired amplitude and polarity; means connecting one of said cells, said load impedance and said means for producing a direct voltage in series across said terminals; a connection consisting entirely of a conductor of negligible impedance between the photocathode of the other cell and the anode of said one cell, a connection consisting entirely of a conductor of of negligible impedance between the anode of the other cell and the photocathode of said one cell; means for applying a periodically varying illumination equally to said cathodes; an alternating current amplifier; means for applying the alternating current component of the voltage across said load resistance to the input of said alternating current amplifier; and means for producing a direct current output voltage from the output of said alternating current amplifier, said last means comprising means for comparing the phase of said amplifier output with the phase of said periodic illumination and for producing an output signal of one polarity when said phases are the same and of opposite polarity when said phases are opposed.

6. A converter comprising first and second photocells each having a photocathode and an anode; a pair of direct current input terminals; a load resistance; means for producing a direct voltage of desired amplitude and polarity; means connecting one of said cells, said load impedance and said means for producing a direct voltage in series across said terminals; a connection consisting entirely of a conductor of negligible impedance between the photocathode of the other cell and the anode of said one cell, a connection consisting entirely of a conductor of negligible impedance between the anode of the other cell and the photocathode of said one cell; a gaseous discharge device light source arranged to illuminate said photocathodes equally; means to energize said gaseous discharge device from a source of alternating current through a unidirectional device whereby one flash of light is produced for each cycle of said alternating current; an alternating current amplifier; means for applying the alternating component of the voltage across said load resistance to the input of said amplifier; a phase-sensitive detector comprising a pair of rectifiers having output impedances connected in series and oppositely poled; means for applying the output of said amplifier with equal amplitude and opposed phase to the inputs of said rectifiers; means for applying the alternating voltage of said alternating current source to the inputs of said rectifiers with equal amplitude and like phase; and a direct current output circuit connected across said series connected rectifier output impedances.

References Cited in the file of this patent

UNITED STATES PATENTS

| | | |
|---|---|---|
| 2,336,550 | Kruper | Dec. 14, 1943 |
| 2,395,482 | Hurley | Feb. 26, 1946 |
| 2,444,442 | Herbold | July 6, 1948 |
| 2,457,099 | Zworykin | Dec. 21, 1948 |
| 2,593,616 | Schroeder et al. | Apr. 22, 1952 |
| 2,721,277 | Boundy et al. | Oct. 18, 1955 |